US006954424B2

(12) United States Patent
Barrack et al.

(10) Patent No.: US 6,954,424 B2
(45) Date of Patent: Oct. 11, 2005

(54) CREDIT-BASED PACING SCHEME FOR HETEROGENEOUS SPEED FRAME FORWARDING

(75) Inventors: Craig I. Barrack, Irvine, CA (US); Brian Yang, Mountain View, CA (US); John Lam, Foothill Ranch, CA (US); Rong-Feng Chang, Irvine, CA (US)

(73) Assignee: Zarlink Semiconductor V.N., Inc., Irvine, CA (US)

( * ) Notice: Subject to any disclaimer, the term of this patent is extended or adjusted under 35 U.S.C. 154(b) by 934 days.

(21) Appl. No.: 09/794,184

(22) Filed: Feb. 26, 2001

(65) Prior Publication Data

US 2001/0033552 A1 Oct. 25, 2001

Related U.S. Application Data

(60) Provisional application No. 60/184,671, filed on Feb. 24, 2000.

(51) Int. Cl.[7] .................................................. H04J 1/16
(52) U.S. Cl. .......................................................... 370/229
(58) Field of Search ................................. 370/229, 230, 370/231, 232, 233, 234, 235, 236, 252, 254, 241, 250, 465, 389, 466, 411, 412, 413, 414, 468

(56) References Cited

U.S. PATENT DOCUMENTS

| | | | | |
|---|---|---|---|---|
| 5,121,382 A | * | 6/1992 | Yang et al. | ................... 370/250 |
| 5,734,646 A | * | 3/1998 | I et al. | ........................ 370/335 |
| 5,787,086 A | | 7/1998 | McClure et al. | |
| 5,982,760 A | * | 11/1999 | Chen | ........................... 370/335 |
| 6,032,179 A | | 2/2000 | Osborne | |
| 6,078,733 A | | 6/2000 | Osborne | |
| 6,584,109 B1 | * | 6/2003 | Feuerstraeter et al. | ...... 370/401 |

OTHER PUBLICATIONS

H.T. Kung, et al.; "Receiver–Oriented Adaptive Buffer Allocation in Credit–Based Flow Control for ATM Networks"; Proc. INFOCOM '95, pp. 1–14.

H. Lauer; "On the Duality of Rate–Based and Credit–Based Flow Control"; Mitsubishi Electric Research Laboratories, Inc., Jan. 30, 1995; pp. 1–18.

H. T. Kung, et al.; "Credit–Based Flow Control for ATM Networks: Credit Update Protocol, Adaptive Credit Allocation, and Statistical Multiplexing"; Division of Applied.

H. T. Kung, et al.; "Credit–Based Flow Control for ATM Networks"; Division of Applied Sciences; pp. 1–11.

H. T. Kung, et al.; "Use of Link–By–Link Flow Control in Maximizing ATM Network Performance: Simulation Results"; IEEE Hot Interconnects Symposium, '93; pp. 1–12.

* cited by examiner

*Primary Examiner*—Dang Ton
(74) *Attorney, Agent, or Firm*—Tucker Ellis & West LLP

(57) ABSTRACT

A credit-based pacing scheme for heterogeneous speed frame forwarding. A control logic controls the transmission of data between a source device and a destination device in accordance with a handshaking protocol. Pacing logic paces the transmission of the data from the source device to the destination device to prevent congestion in the switching fabric. A credit scheme is used to arbitrate among multiple pacing modules per device, each forwarding data at a different rate.

20 Claims, 7 Drawing Sheets

CREDIT-BASED PACING SCHEME FOR HETEROGENEOUS SPEED FRAME FORWARDING

This application claims priority under 35 U.S.C. § 119(e) from U.S. Provisional Patent application Ser. No. 60/184,671 entitled "Credit-Based Pacing Scheme For Heterogeneous Speed Frame Forwarding" filed Feb. 24, 2000.

BACKGROUND OF THE INVENTION

1. Technical Field of the Invention

This invention is related to digital data network switching fabrics and, more specifically, to a method of simplifying frame forwarding by controlling data frames received from various multi-speed data ports within the switching system.

2. Background of the Art

Congestion management in switching systems is important to ensure lossless data flow between transmitting and receiving network devices. Data flow typically comes in two varieties—smooth and bursty. A smooth traffic source device outputs a constant and predictable load, while bursty data traffic lacks the same type of predictability. An example of bursty traffic is when a user connected to the Internet clicks on a link in order to view a web page or an image. The result is an immediate demand to retrieve the file associated with that link, causing a burst of data traffic on the network. When millions of users are "surfing" the Internet, such data flow control becomes problematic.

Rate-based and credit-based are two "closed-loop" flow control methods which offer a more efficient level of data flow control in networks by providing feedback from the data receiver (or destination) to the data transmitter (or source device). The rate-based technique involves providing feedback from the network to each data source device to cause those source devices to slow-down or speed-up the transfer of data. The credit-based approach involves providing feedback to the data source device of the capability of the destination device to accept additional data before overflowing. The credit-based data source device counts the number of data "frames" sent, and each destination device counts the number of data frames received. Flow control from the source device is accomplished by allocating buffer space for the source device, in the destination device, and then ensuring that no overflow of the allocated buffer space in the destination device occurs by maintaining a non-negative credit balance at the source device. The destination device maintains a count of the number of frames of buffer space allocated to each source device connection and occupied by each source device connection. Periodically, the destination device generates a credit frame and feeds it back to the source device. The credit frame specifies the availability of buffer space for receiving data frames from the source. After receiving the credits, the source device is then eligible to forward some number of data frames to the destination at any available bit rate, and in accordance with the credit limit stipulated in the credit frame.

In practice, a variety of networks (and network devices) associated with a switching fabric operate at different transmission speeds, requiring switching devices to include large buffers in order to handle the potential congestion problems associated with these multi-bandwidth architectures. What is needed is a flow control architecture which reduces the requirement for large buffers and minimizes congestion by allowing source devices to send frames only when the destination device can receive the frames, and by pacing transmission of the frames in a heterogeneous environment at a data rate which coincides more closely to the bandwidth of the corresponding destination device.

SUMMARY OF THE INVENTION

The present invention disclosed and claimed herein, in one aspect thereof, is a method of controlling the flow of data in a heterogeneous speed network switching environment. A control logic controls the transmission of the data between a source device and a destination device in accordance with a handshaking protocol. Pacing logic paces the transmission of the data from the source device to the destination device to prevent congestion in the switching fabric. A novel credit scheme is used to arbitrate among multiple pacing modules per device, each forwarding data at a different rate.

BRIEF DESCRIPTION OF THE DRAWINGS

For a more complete understanding of the present invention and the advantages thereof, reference is now made to the following description taken in conjunction with the accompanying Drawings in which:

FIG. 4b illustrates a graph for discussing one solution to resolving the oversize frame scenario of FIG. 4a;

DETAILED DESCRIPTION OF THE INVENTION

In one aspect of the invention, frames are switched from a port on one source device to a port on a remote (or destination) device in order to prevent large buffer and bandwidth requirements, and to simplify flow control. This is preferably accomplished using a three-step method. First, a handshaking protocol is implemented between the input buffer of the source device and the output port of the destination device. The handshaking protocol is designed to keep data from arriving at the destination device until it is specifically requested, and when requested, the data can be transmitted to the wire (output port of the destination device) substantially immediately. Second, a pacing mechanism is implemented which prevents congestion in the middle of the network by transmitting data frames from the source device at or near the transmission rate at which the frames will eventually be transmitted from the destination device. However, if there are two different-speed ports in the network, for example, Gigabit (1000 Mbps) and Fast Ethernet (100 Mbps), then the pacing mechanism comprises two different pacing modules which must coexist and dynamically share the bandwidth. Third, there is provided a credit scheme for arbitrating between two or more pacing modules per source device, each forwarding data at a different rate. Note that disclosed methods are also applicable to networks having more than two port speeds (i.e., more than two pacing speeds).

Figure 1:
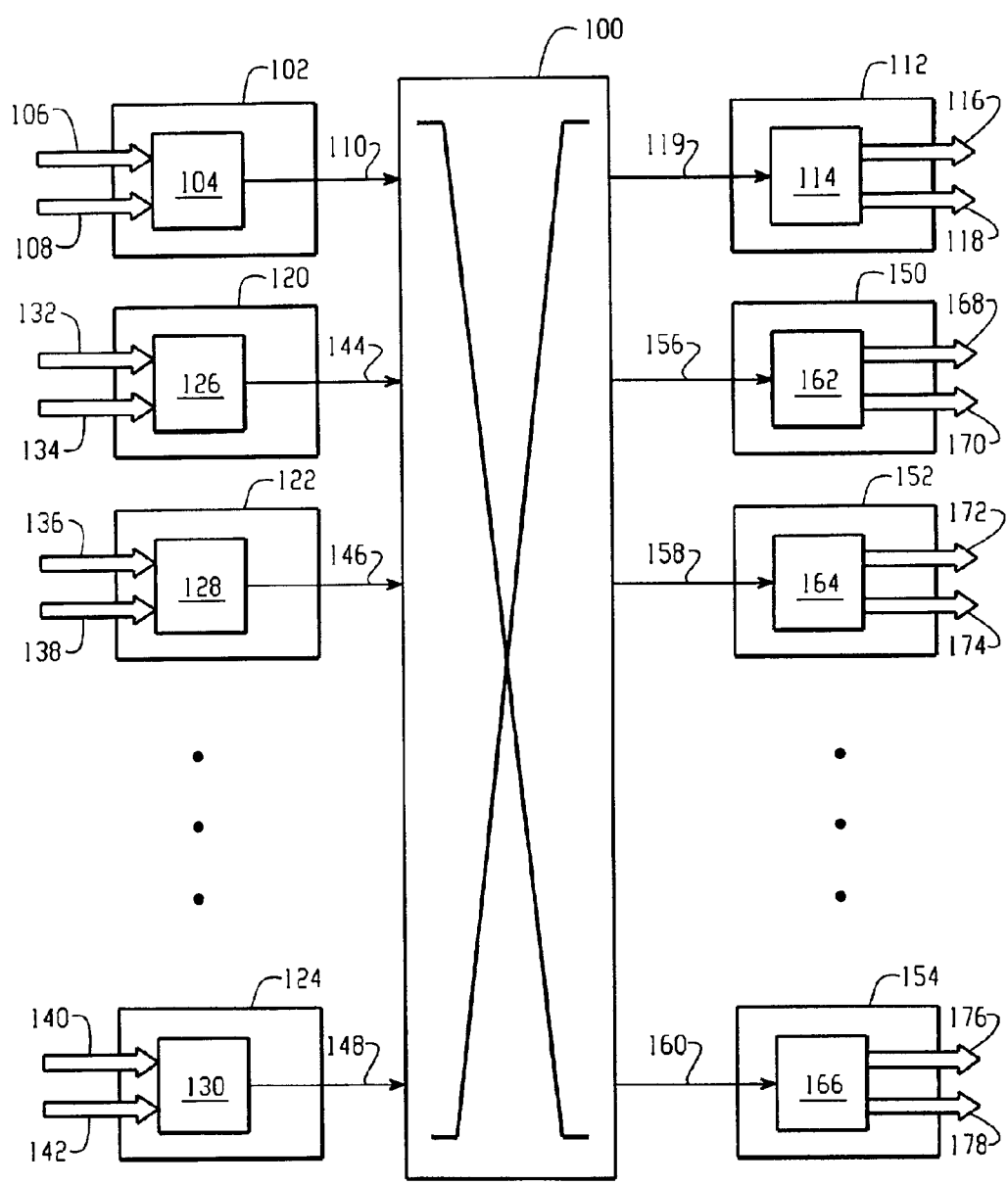
FIG. 1 illustrates a general block diagram of a heterogeneous credit-based implementation.

Referring now to FIG. 1, there is illustrated a general block diagram of a multi-port, multi-bandwidth implementation. A switching fabric 100 has connected thereto a source device 102 which comprises an input buffer 104 for buffering one or more frames received from one or more input ports 106, each of which operate at a first bandwidth, and for buffering one or more frames received from one or more input ports 108, each of which operate at a second bandwidth. The output port 110 of the source device 102 connects to the switching fabric 100 and outputs data thereto at a maximum data rate (or bandwidth). In an application where the source device 102 has two sets of input ports (106 and 108), each operating at different data rates, the frames enter on one or more $\alpha$ ports 106 at R Mbps, and/or one or more $\beta$ ports 108 at S Mbps. (Notably, the disclosed novel embodiments are not restricted to two port speeds, although two port speeds are shown for illustrative purposes.) For example, the source device 102 can be a distributed switch having 24 Fast Ethernet ports and 2 Gigabit Ethernet ports (in this case $\alpha$=24, R=100, and $\beta$=2, S=1000, respectively). The received frames then need to be transferred from the source device 102 through the switching fabric 100 to a proper destination device 112. The destination device 112 receives the frames via a switching fabric output port 119 into an output queue (or buffer) 114 which services one or more destination device output ports 116 and 118.

The heterogeneous environment of FIG. 1 implements a handshaking protocol between the source device 102 and destination device 112. When the source input buffer 104 approaches a predetermined capacity, this indicates that the destination device queue 114 is becoming congested (i.e., failing to process the received frames at a rate sufficient to prevent the source input buffer 104 from becoming backlogged). In response to the destination device 112 receiving a schedule request signal from the source device 102, the destination device 112 sends a data request signal to the source device 102 when the destination device input queue 114 has the space available to receive additional frames. The source device 102 then queues the data requests in a corresponding data request queue, and transmits the associated frames when the data request is processed.

In this particular embodiment, the source device 102 also comprises a dual ring queue pacing architecture to pace transmission of the data frames from the source device 102 to the respective destination device at or near the wire speed of the switching fabric output port 119 in order to reduce congestion in the switching fabric 100.

The general embodiment of FIG. 1 comprises a plurality of other source devices (120, 122, and 124) which connect to the switching fabric 100 for the transmission of frames therethrough. Each of the source devices (120, 122, and 124) comprises a corresponding input buffer (126, 128, and 130), and multiple input ports (132 and 134, 136 and 138, and, 140 and 142, respectively) for receiving data frames. Each source device (120, 122, and 124) has a corresponding output port (144, 146, and 148) which connects to the switching fabric 100. The switching fabric 100 outputs data frames to any number of additional destination devices (150, 152, and 154) via corresponding switching fabric output ports (156, 158, and 160) to respective output buffers (162, 164, and 166). Output buffer 162 of destination device 150 services one or more output ports (168 and 170), which output ports (168 and 170) can accommodate data at different bandwidths. Similarly, output buffer 164 of destination device 152 services one or more output ports (172 and 174), which output ports (172 and 174) can accommodate data at different bandwidths. Output buffer 166 of destination device 154 services one or more output ports (176 and 178), which output ports (176 and 178) can accommodate data at different bandwidths.

Figure 2:
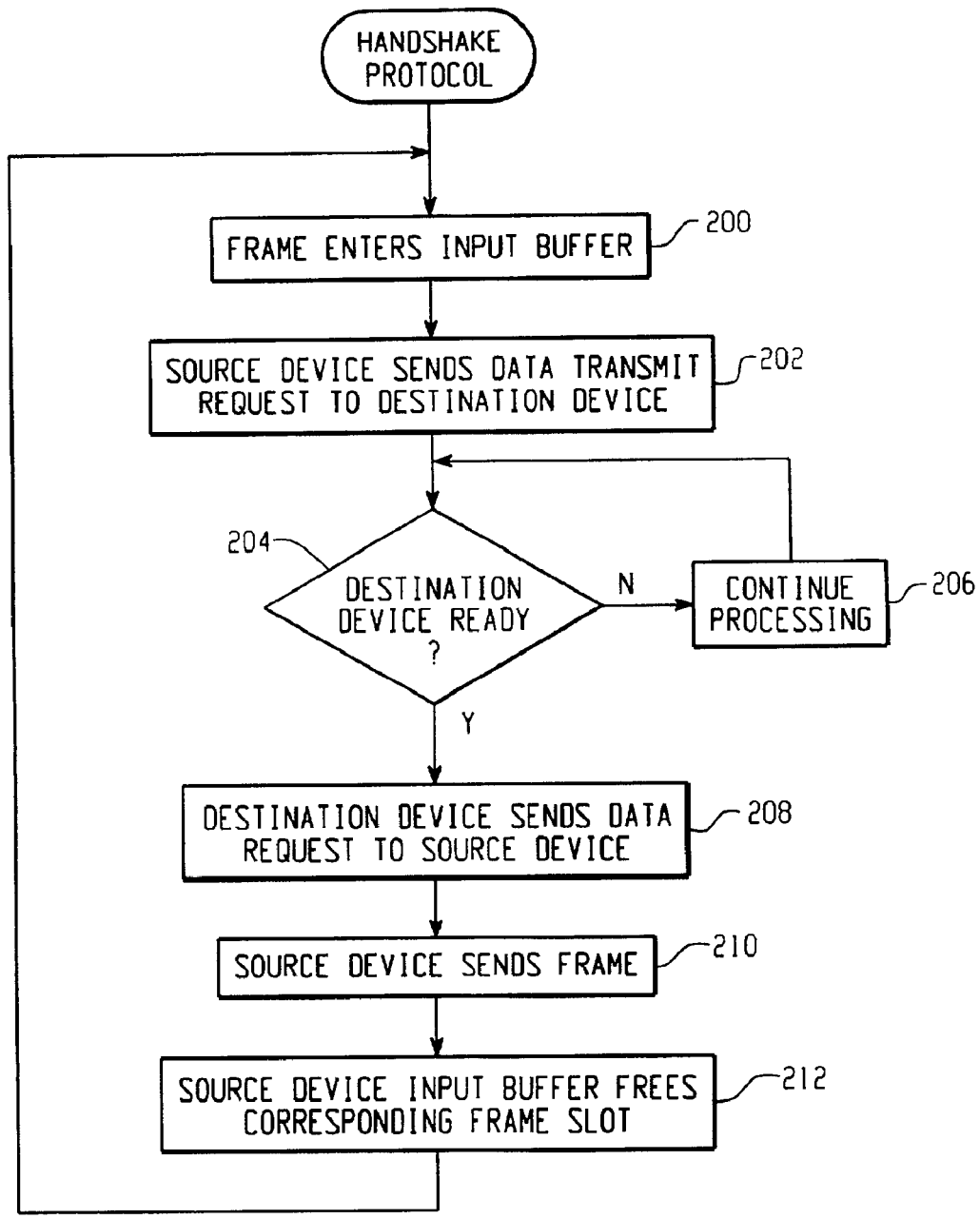
FIG. 2 illustrates a flow chart of a handshake protocol utilized for flow control between source and destination devices.

Referring now to FIG. 2, there is illustrated a flow chart of a handshake protocol utilized for flow control between source and destination devices. In the exemplary scheme, when a frame enters the input buffer 104 of source device 102, as indicated in a function block 200, the source device 102 sends a short transmission scheduling request signal to the desired output port (e.g., port 116 or 118) of the proper destination device (e.g., destination device 112) as indicated in a function block 202. The output port logic of the destination device targeted for the frame is responsible for collecting all such scheduling request signals transmitted from any of the source devices (102, 120, 122, and 124). Flow continues to a decision block 204 where the destination device 112 determines if it is ready to receive the data frame from the source device 102. If not, flow is out the "N" path to a function block 206 to continue processing local frames. Flow loops back to the input of decision block 204 to then check again. When an output port (116 or 118) of the destination device 112 is ready to receive a frame, flow is out the "Y" path to a function block 208 where the destination device 112 sends the data request signal back to the source device 102, instructing the source device 102 to initiate data transmission. The data is then sent as soon as possible, as indicated in a function block 210, and the corresponding slot in the input buffer 104 of the source device 102 is made available for buffering other incoming data, as indicated in a function block 212. Flow then loops back to the input of function block 200 to process the next frame of data of the source device input buffer 104, in accordance with the disclosed handshaking protocol.

Although the disclosed credit-based pacing scheme is not restricted to the aforementioned source-destination handshaking algorithm, the novel architecture was designed with handshaking in mind. With the implementation of handshaking, control is provided at the destination device over the total number of frames that are substantially simultaneously being forwarded to a particular destination device (e.g., 112, 150, 152, and 154). Therefore, total buffer space can substantially and calculably be reduced in the switching fabric 100 itself. Additionally, with reference to the discussion of FIG. 1, T can be kept to a data rate which is not much larger than $\alpha R + \beta S$. Another advantage is that when flow control is implemented in the source device 102, the location of the flow control logic is proximate to the points of control, which location means that the control logic can be less complex than if utilized to control flow in the switching fabric 100 or destination device 112. For example, the flow control architecture is closer to the trigger of flow control (i.e., the trigger being that the input buffer 104 reaches a predetermined backlogged capacity which indicates that the destination queue 114 is becoming congested by not processing frames fast enough) and can respond to the trigger action more quickly by prohibiting the corresponding input port of the source device 102 from transmitting any more frames.

Even after the total amount of data being transferred to each destination device (112, 150, 152, and 154) has been regulated, buffers of the switch fabric 100 can still be stressed if the data from the many source devices (102, 120, 122, and 124) is not carefully paced. Indeed, if the destination device 112 only has α+β pending data requests enqueued in a source device having an aggregate rate of αR+βS<T Mbps, those data requests may be scattered among y different source devices (102, 120, 122, and 124). If each source device (102, 120, 122, and 124) were to send data requested by the destination device 112 at the maximum rate of T Mbps, then the switching fabric 100 would receive data destined for the destination device 112 at γT Mbps, but could only transmit such data at T Mbps at the corresponding switching fabric output port 119. Consequently, large buffers would be required in the switching fabric 100 to hold the surplus data.

Figure 3:
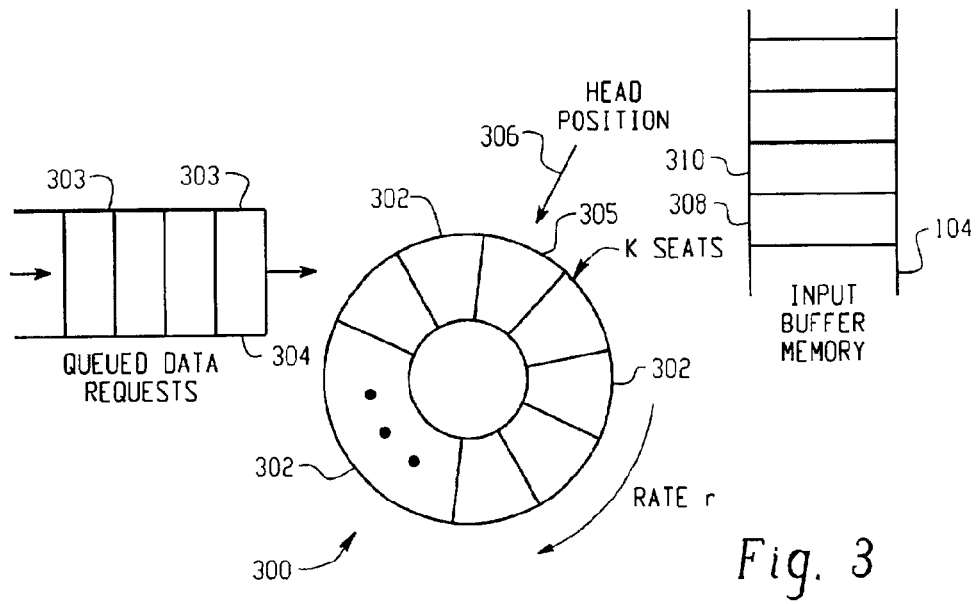
FIG. 3 illustrates a source device ring queue pacing mechanism.

Referring now to FIG. 3, there is illustrated a source device ring queue pacing mechanism. The ring queue 300 is a small buffer in the source device (e.g. source device 102) with sufficient buffer space to hold K data requests, which data requests are received from the one or more destination devices (112, 150, 152 and 154). The K spaces 302 which hold the data requests are referred to as seats. If the number of enqueued data request jobs 303 waiting in a data request queue 304 exceeds the number of seats 302, then the excess data requests cannot enter the ring queue 300 until a seat 302 becomes unoccupied, and remain enqueued in the data request queue 304. When a given data request 305 is at a head position 306 of the ring queue 300 (i.e., next to be processed), an associated frame 308 in the input buffer 104 of the source device 102 is accessed, and a next-in-order fragment 310 associated with that frame 308 is retrieved and transmitted to the switch fabric 100. (The size of frame fragments is an implementation issue, and is not prohibitive with this disclosed novel architecture.)

The ring queue 300 "turns" at a rate of r seats/μs. The value of r is calculated so that one full turn of the ring queue 300 corresponds to the desired pacing rate per frame. For example, if the ring queue 300 contains twenty-seven seats 302, a desired pacing rate per frame is 118 Mbps, and a maximum fragment size is 128 bytes, then the ring queue 300 should "turn" at approximately 3.1 seats/μs [(27 seats× 118 Mbps)/(128 bytes×8 bits/byte)]. Of course, if a ring queue seat 302 is unoccupied, then no data request can be processed while this seat 302 is at the head position 306 of the ring queue 300. When an end-of-frame fragment associated with a given data request has been transmitted, the data request has been satisfied, and the corresponding seat 302 in the ring queue 300 is vacated.

Figure 4A:
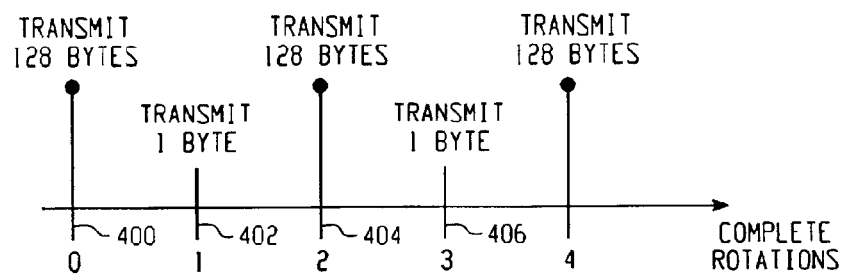
FIG. 4a illustrates a graph used in the discussion of processing an oversize frame when using the ring queue.

Referring now to FIG. 4a, there is illustrated a graph used for discussion of the oversize frame scenario. Because end-of-frame fragments are frequently shorter than the maximum fragment size, it is possible that there could be a resource utilization problem on some traffic patterns, depending on the system implementation. For example, if the maximum frame size is 128 bytes, but all frames in a particular traffic pattern are 129 bytes, then during every other full turn of the ring queue 300, only one byte per ring queue seat 302 will be transmitted. As illustrated, when the data request is at the head position 306 and processed, 128 bytes of the 129-byte frame will be transmitted on a first rotation 400. On a second rotation 402, the remaining 1-byte fragment is then transmitted. Similarly, when the next data request is at the head position 306, its corresponding 128-byte segment of the 129-byte frame is transmitted on a next rotation 404, and the remaining 1-byte fragment is transmitted on a following fourth rotation 406. Whether this presents a bottleneck in the switching fabric 100 depends primarily on the system speedup (the ratio of the switching fabric port bandwidth T and the aggregate bandwidth of all the source device input ports (106 and 108), i.e., αR+βS).

Figure 4B:
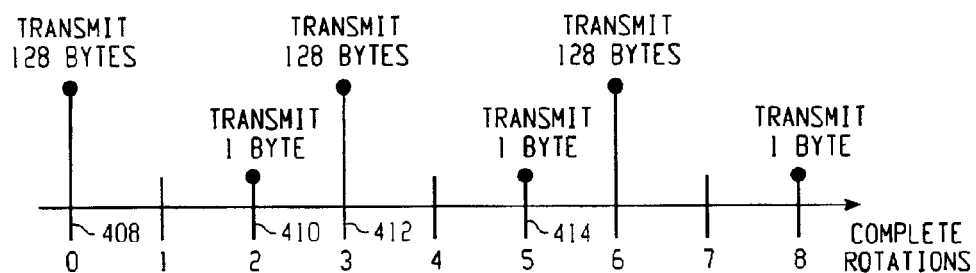

Referring now to FIG. 4b, there is illustrated a solution to resolving the oversize frame scenario of FIG. 4a. One solution is to double the "rotational" speed of the ring queue 300 (i.e., double the rate r), and retrieve and transmit maximum-sized frames (i.e., 128 bytes of the 129-byte frames) only on alternate turns of the ring queue 300. This change provides the flexibility to transmit data at twice the rate r (or 2r), if the size of an end-of-frame fragment is below a certain threshold, for example, 75% of the maximum fragment size. In this embodiment, when the data request 305 is in the head position 306 of the ring queue 300 of FIG. 3, 128 bytes of the corresponding 129-byte frame are transmitted to the destination device (e.g., destination device 112), as indicated in a first rotation position 408. Two complete rotations later, at a position 410, its 1-byte fragment is transmitted. One rotation later, at a position 412, 128 bytes of the next frame are transmitted, followed two rotations later, at a position 414, by its corresponding 1-byte fragment being transmitted.

Figure 5:
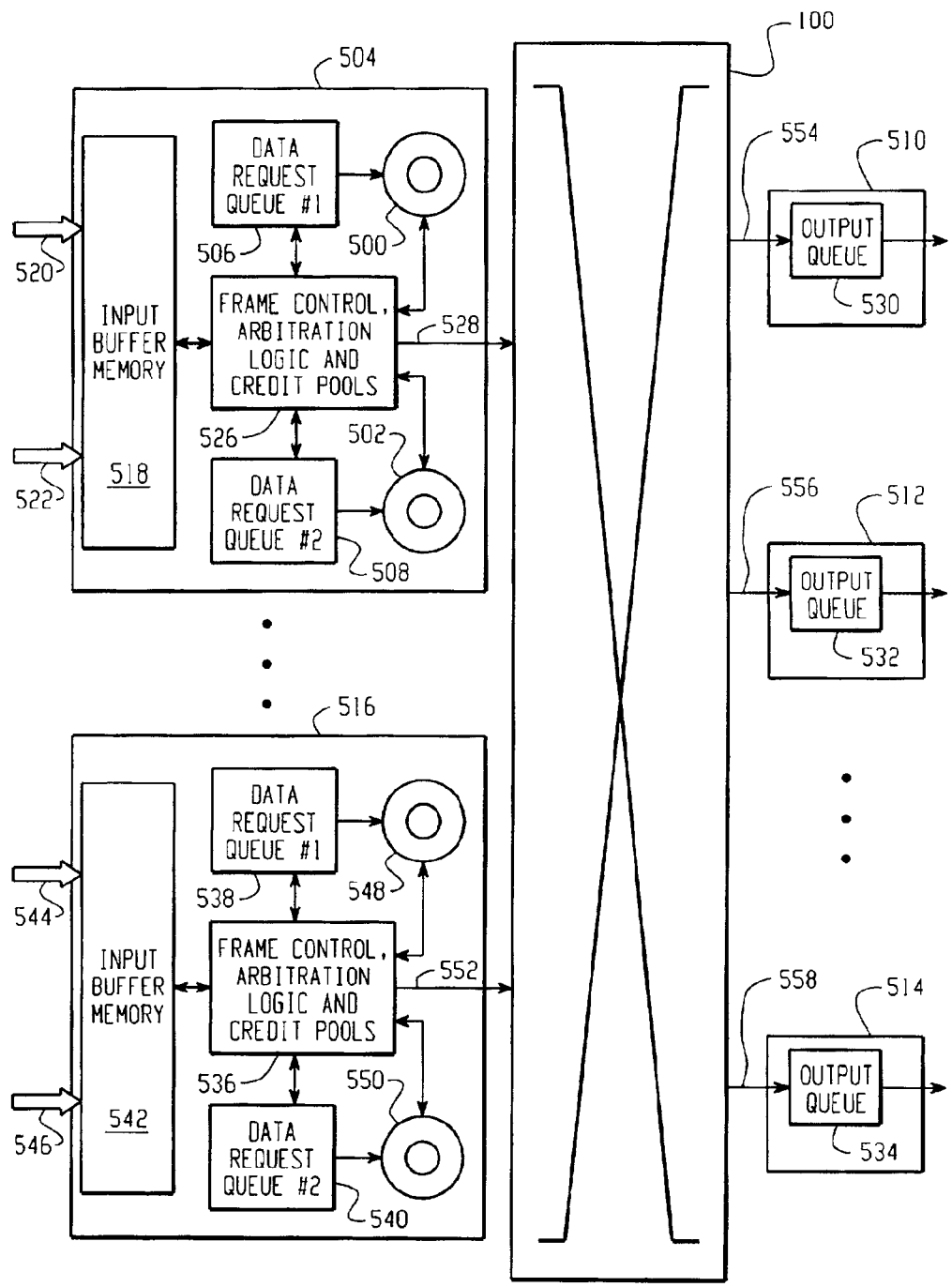
FIG. 5 illustrates a block diagram of a dual bandwidth multiport pacing embodiment.

Referring now to FIG. 5, there is illustrated a block diagram of a dual bandwidth, multiport pacing embodiment. In this particular embodiment of the generalized system of heterogeneous speed ports, a credit-based architecture is disclosed which arbitrates between two ring queues (500 and 502, each of which is similar to ring queue 300) per source device 504, wherein each ring queue (500 and 502) forwards data at a different rate (e.g., a slow ring queue 500 and a fast ring queue 502) to the switching fabric 100. The source device 504 also comprises two data request queues (506 and 508) in association with the respective ring queues (500 and 502), for buffering data requests from one or more destination devices (510, 512, and 514) connected to the output side of the switching fabric 100. As mentioned hereinabove, the data requests are sent from any one or more of the destination devices (510, 512, and 514) in response to transmission scheduling requests sent from the source device 504 (in this particular example), or any other source device 516 (similar to source device 504). The source device 504 also comprises an input buffer 518 for receiving and buffering incoming frames from one or more input ports 520, each operating at the same bandwidth, and a second set of one or more ports 524, each operating at the same bandwidth. In operation, the ports 520 and 522 may operate at the same bandwidth, or a different bandwidth.

A control block 526 comprises arbitration logic, and connects to both the first and second data request queues (506 and 508) to arbitrate data request processing between the two data request queues (506 and 508). The control block 526 also connects to the input buffer 518 such that as frame control logic of the control block 526 tracks the progress of data requests moving through the data request queues (506 and 508), it retrieves from the input memory buffer 518 the frame (or frame fragment) which corresponds to the data request 305 at the head position 306 of the respective ring queues (500 and 502). The control block 526 also controls private and shared credit pools (which are discussed in greater detail hereinbelow) utilized for credit-based pacing of the frames (and/or frame fragments). Any frames which are forwarded are transmitted to the switching fabric 100 over a source device output port 528. If destination device 510 had received a transmission request from the source device 504, and was now ready to receive the corresponding data from the source device 504, the destination device 510 will send the data request to the source device 504. If the data request was associated with a "slow" output port of the destination device 510, the source device 504 will forward that received data request to the appropriate slow data request queue, data request queue 506, for processing by the slow ring queue 500. On the other hand, if the data request was associated with a "fast" output port of the destination device 510, the source device 504 will forward that received data request to the appropriate fast data request queue, data request queue 508, for processing by the fast ring queue 502.

Each destination device (510, 512, and 514) connects to the switching fabric 100 and has associated therewith a respective output queue (530, 532, and 534) which receives and buffers frames received from the one or more source devices (504 and 516). Each of the output queues (530, 532, and 534) is operative to handle only frames of a specific bandwidth, however, each destination device (510, 512, and 514) can accommodate a plurality of other output queues (not shown) in order to accommodate a variety of frames transmitted at many different speeds.

The second illustrated source device 516 (of a plurality of source devices) also comprises the same internal queues and control logic. For example, a second control block 536 comprises arbitration logic, and connects to both a first data request queue 538 and a second data request queue 540 to arbitrate data request processing between the two data request queues (538 and 540). The control block 536 also connects to an input buffer 542 for receiving and buffering incoming frames from one or more input ports 544, and from one or more ports 524. Frame control logic of the control block 536 tracks the progress of data requests moving through the data request queues (538 and 540) in order to retrieve from the input buffer 542 the frame (or frame fragment) which corresponds to the data request 305 at the head position 306 of respective slow and fast ring queues 548 and 550. The control block 536 also controls private and shared credit pools utilized for credit-based pacing of the frames (and/or frame fragments). Any frames which are forwarded are then transmitted to the switching fabric 100 over a source device output port 552.

As mentioned hereinabove, the data requests are sent from any one or more of the destination devices (510, 512, and 514) in response to transmission scheduling request signals sent from the source device 516, or any other source device. The input buffer 542 receives and buffers incoming frames from one or more input ports 544, each having the same bandwidth. The input buffer 542 also buffers incoming frames from one or more ports 546, each having a second bandwidth, and which second bandwidth may be different from the bandwidth of the one or more ports 544. If destination device 512 had received a transmission request from the source device 516, and was now ready to receive the corresponding data from the source device 516, the destination device 512 will send the data request to the source device 516. If the data request was associated with a slow output port of the destination device 512, the source device 516 will forward that received data request to the appropriate slow data request queue, data request queue 538, for processing by the slow ring queue 548. On the other hand, if the data request was associated with a fast output port of the destination device 512, the source device 516 will forward that received data request to the appropriate fast data request queue, data request queue 540, for processing by the fast ring queue 550.

Note that use of a single ring queue 300 per source device (504 and 516) to forward all frames, regardless of the destination devices, can be problematic in a heterogeneous environment. For example, if a pacing rate r is substantially less than the transmit speed of the fastest port (i.e., r<<max (R,S)), then frames destined for the faster ports will suffer long latency, even under light loading. Furthermore, the faster ports will require substantial buffering capability, since forwarding at a slower rate means that multiple data requests will have to be made simultaneously by each faster port in order to sustain wire speed transmission. When the data requests have been fulfilled and all of the requested data arrives, there needs to be sufficient buffer space at the destination device to store the received data. On the other hand, if the pacing rate r is substantially greater the than minimum port speed (i.e. r>>min (R,S)), then the output rate T of the source device needs to be large enough to accommodate accelerated frame forwarding. If the output rate T is not large enough, then data will not arrive at the destination devices at a rate sufficient to preclude each destination device from sending an inordinate number of data requests back to the source device. The number of simultaneous data requests made by each destination device will then need to be restricted to fewer than one per port, which restriction will cause significant jitter and degradation of throughput.

A single ring queue for pacing frame forwarding in a credit-based homogeneous environment can provide the same advantages disclosed herein in accordance with a heterogeneous environment.

Notably, the disclosed credit-based architecture is extensible to more than two port speeds, if desired. All that is required is that the output port rate T of any output port (552, 554, and 558) of the switching fabric 100 must exceed the aggregate incoming bandwidth of each source device (504 and 516). In this particular embodiment having two source input port speeds R and S, which speed R is associated with source input ports 520 and 544, and speed S is associated with input ports 522 and 546, $T > \alpha R + \beta S$, and the speedup does not have to be large, as would be true in other conventional algorithms.

Figure 6:
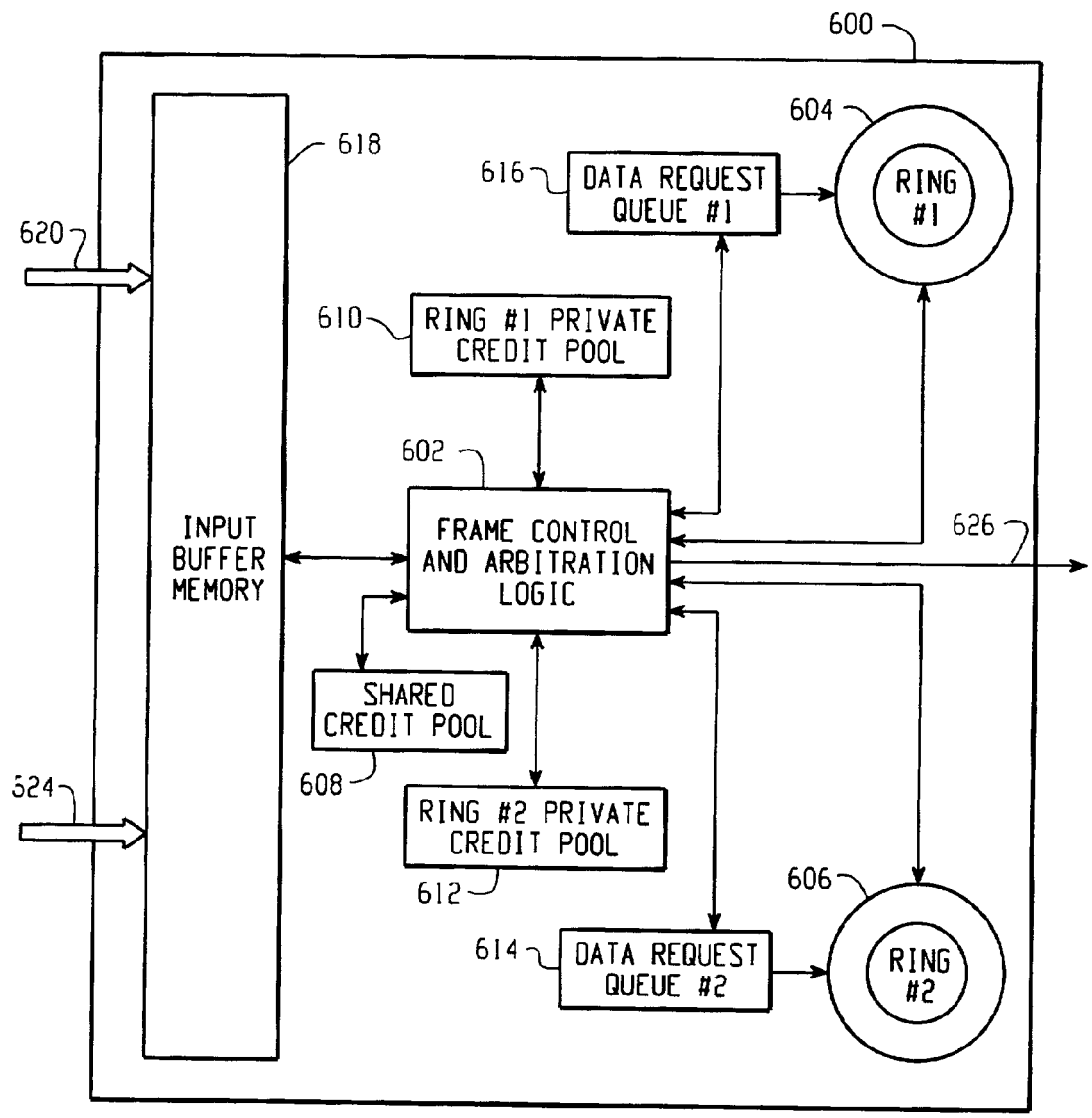
FIG. 6 illustrates a dual bandwidth multiport pacing embodiment, and the credit pools associated therewith.

Referring now to FIG. 6, there is illustrated a dual bandwidth multiport pacing embodiment of a source device 600, and the credit pools associated therewith. The source device 600 (similar to source device 504) comprises arbitration and control logic 602 (similar to that employed in control block 526) which utilizes several parameters in order to monitor and control the disclosed credit-based architecture. Let SEATS_X denote the total number of seats in a slow ring queue 604 (similar to slow ring queue 500), which slow ring queue 604 has a pacing rate of X Mbps. Let SEATS_Y denote the total number of seats in the fast ring queue 606, which fast ring queue 606 has a pacing rate of Y Mbps, and where X<Y. Let n denote the total number of credits in a shared credit pool 608 which are initially available for use in forwarding data to the switching fabric 100. The value of n is defined to be the truncated value of T/Y (i.e., the integer value). For example, if the resulting division is 6.3, the value of n is 6. Note that the parameters SEATS_X, SEATS_Y, and n, are constants.

Two variables which can be maintained by various registers of the arbitration and control logic 602 are OCCUPIED_SEATS_X and OCCUPIED_CREDITS_X. The variable OCCUPIED SEATS X denotes the total number of occupied seats in the slow ring queue 604 having the pacing rate of X Mbps. The variable OCCUPIED_CREDITS_X denotes the number of credits currently possessed by the slow ring queue 604. All credits initially start in the shared credit pool 608, but during the execution of the algorithm, credits will be moved back and forth among the shared credit pool 608 and private credit pools (610 and 612) of the respective slow and fast ring queues (604 and 606). The control logic 602 connects to both data request queues 614 and 616 such that data requests received from fast destination ports (i.e., fast data requests) are received by the control logic 602 and routed for stacking in the fast data request queue 614 (similar to data request queue 508), and data requests received from slow destination ports (i.e., slow data requests) are received by the control logic 602 and routed for stacking in the slow data request queue 616 (similar to data request queue 506). The control logic 602 also connects to the slow and fast ring queues 604 and 606 to monitor the processing of data requests and the availability of seats.

The frame control logic 602 connects to an input buffer memory 618 (similar to input buffer memory 518) which receives frames from one or more source device input ports 620 (similar to input ports 520 and 544), each port operating at a first bandwidth. The input buffer memory 618 also receives frames from one or more source input ports 624 (similar to input ports 522 and 546), each port operating at a second bandwidth. The first data request queue 616 is associated with the slow ring queue 604 and the slow ring private credit pool 610. The second data request queue 614 is associated with the fast ring queue 606 and the fast ring private credit pool 612. The control and arbitration logic 602 connects to the shared credit pool 608 to control the sharing of credits with the slow and fast private credit pools (610 and 612). An output port 626 connects the source device 600 to the switching fabric 100, which output port 626 receives frames released for transmission from the first and second input queues (618 and 622) in accordance with processed and arbitrated data requests.

Figure 7:
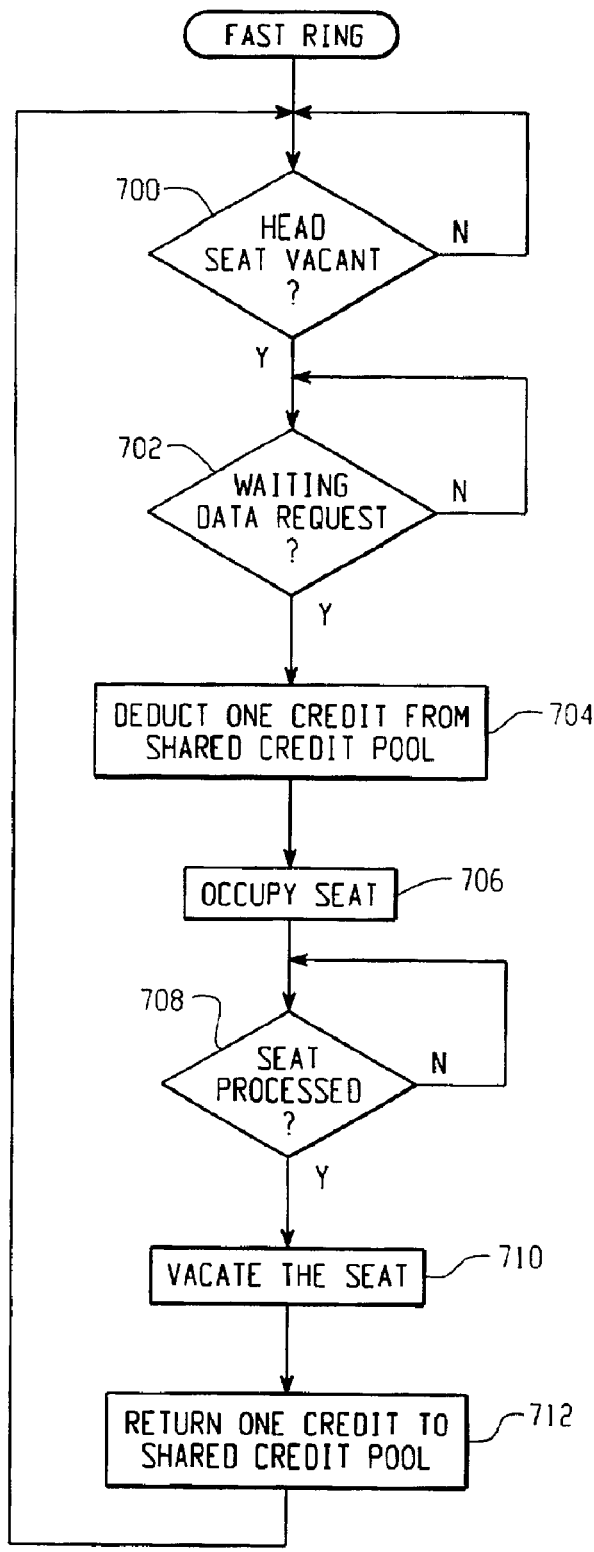
FIG. 7 illustrates a flow chart of operation of the fast ring in a dual bandwidth credit-based pacing embodiment.

Referring now to FIG. 7, there is illustrated a flow chart for the operation of the fast ring logic. Flow begins at a decision block 700 to determine if the head seat position 306 of the fast ring queue 606 is vacant. If not, flow is out the "N" path, and loops back to the input of decision block 700 to continue monitoring the status of the head seat 306. If the head seat position 306 is vacant, flow is out the "Y" path of decision block 700 to a decision block 702 where a check is performed by the control and arbitration logic 602 to determine if there is a waiting data request in the fast data request queue 614, and if a credit is available from the shared credit pool 612. If not, flow is out the "N" path and loops back to the input of the decision block 702 to continue monitoring the data request queue 614. If both conditions are true (i.e., the head seat is vacant and there is a data request waiting to be processed), flow is out the "Y" path to a function block 704 to then deduct one credit from the shared credit pool 608 and place it in the private credit pool 612 of the fast ring queue 606. Additionally, that head seat 306 in the fast ring queue 606 becomes occupied with that fast data request, as indicated in a function block 706. The fast ring queue 606 then processes the data request. Flow is then from function block 706 to a decision block 708 to determine if the data request associated with the seat is processed. If not, flow is out the "N" path, and loops back to the input of decision block 708 to continue monitoring the corresponding ring queue seat 302. If it is processed, flow is out the "Y" path to a function block 710 to vacate the seat 302. Once vacated, the control logic 602 then returns one credit from the fast ring private pool 612 to the shared credit pool 608. Flow then loops back to the input of decision block 700 to process the next data request in the head seat position 306.

Figure 8:
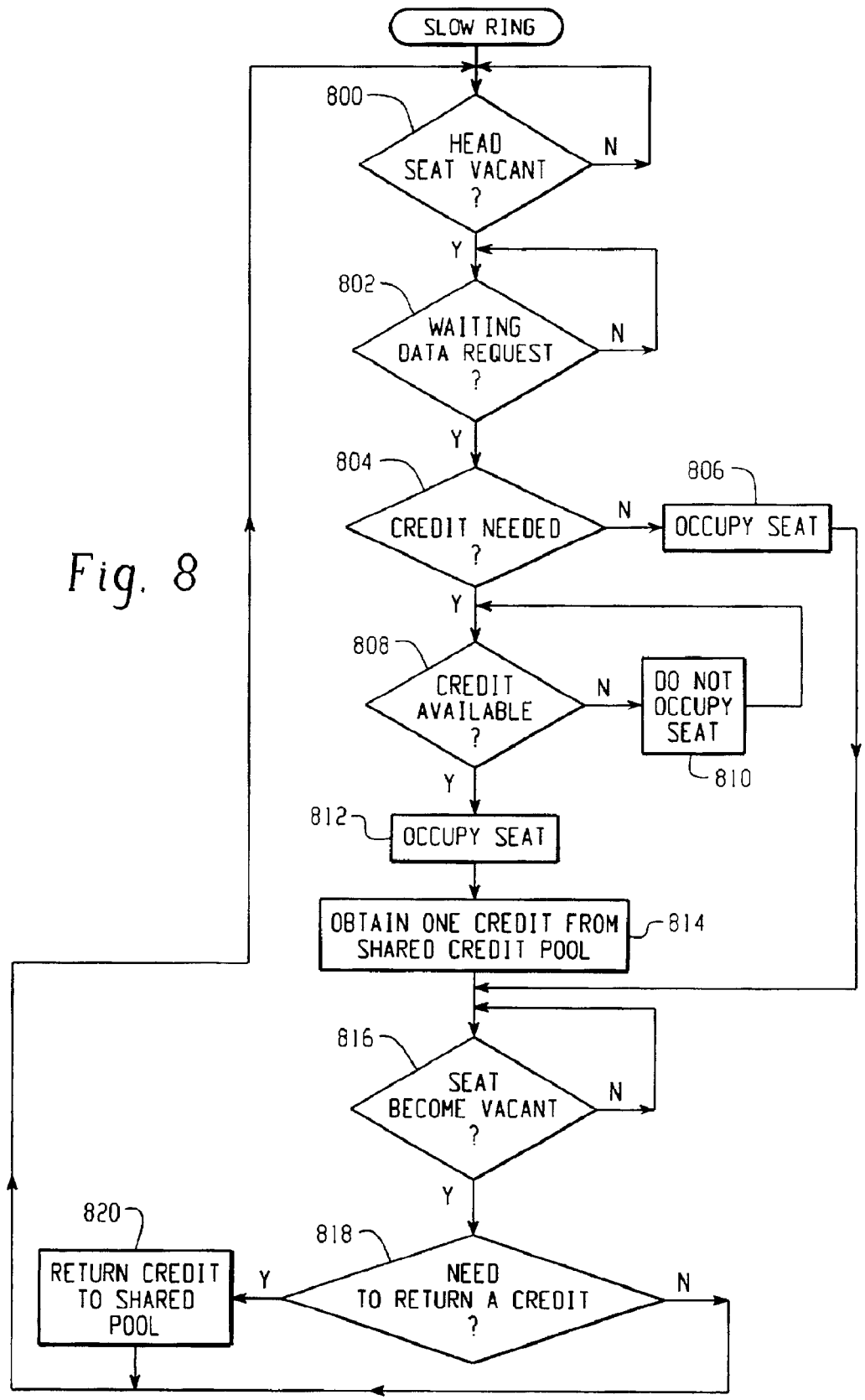
FIG. 8 illustrates a flow chart of the operation of the slow ring in a dual bandwidth credit-based pacing embodiment.

Referring now to FIG. 8, there is illustrated a flow chart of the operation of the slow ring in a dual bandwidth credit-based pacing embodiment. Flow begins at a decision block 800 to determine if the seat in the head position 306 is vacant. If not, flow is out the "N" path and loops back to the input of the decision block 800 to continue monitoring the status of the head seat 306. When the seat at the head position 306 of the slow ring queue 604 is vacant, flow is out the "Y" path to another decision block 802 to determine if a slow data request in the slow data request queue 616 is waiting to be processed. If not, flow is out the "N" path and loops back to the input of the decision block 802 to continue monitoring the slow data request queue 616. If a slow data request is at the head position 306, waiting to be processed, flow is out the "Y" path to a decision block 804 to determine if a credit is required from the shared credit pool 608. A credit may be required from the shared credit pool 608 and placed in the slow ring private credit pool 610, if and only if the following inequality is satisfied:

$$X \cdot (\text{OCCUPIED\_SEATS\_}X+1) + Y \cdot (n - \text{OCCUPIED\_CREDITS\_}X) > T.$$

If the slow ring queue 604 does not require a credit from the shared credit pool 608, flow is out the "N" path to a function block 806 to then occupy the head seat position 306 in the slow ring queue 604. Flow then continues from function block 806 a decision block 816 to determine when the seat becomes vacant. (Further discussion of the flow from decision block 816 will be provided hereinbelow.) However, if a credit is indeed required from the shared credit pool 608, flow continues out the "Y" path of decision block 804 to a decision block 808 to determine if a credit is available in the shared credit pool 608. If no shared credit is available, flow is out the "N" path to a function block 810 indicating that the head seat position 306 cannot be occupied until a credit becomes available. Flow then loops back to the input of decision block 808 to continue monitoring for the availability of a shared credit in the shared credit pool 608. If a credit becomes available in the shared credit pool 608, flow is out the "Y" path of decision block 808 such that the head seat position 306 in the slow ring queue 604 becomes occupied, as indicated in a function block 812. One credit is then subtracted from the shared credit pool 608 and added to the slow ring private credit pool 610, as indicated in a function block 814. Flow continues to the decision block 816 to determine if a seat 302 in the slow ring queue 604 has become vacant. If not, flow is out the "N" path and loops back to the input of decision block 816 to continue monitoring when a seat 302 becomes vacant. If a seat 302 becomes vacant, flow is out the "Y" path to decision block 818 to determine if private credit should be returned to the shared credit pool 608 from the corresponding private credit pool 610. If not, flow is out the "N" path, and loops back to the input of decision block 800. If a private credit needs to be returned, flow is out the "Y" path of decision block 818 to a function block 820 where a credit is then returned from the slow ring queue private credit pool 610 to the shared credit pool 608. Flow then loops back to the input of decision block 800 to again determine if the head seat position 306 is available. Note that one slow ring queue private credit needs to be returned, if and only if:

$$X \cdot \text{OCCUPIED SEATS\_}X + Y \cdot (n - \text{OCCUPIED\_CREDITS\_}X + 1) < T.$$

Consider the following example in accordance with the two-ring embodiment: the slow ring queue 604 has a pacing rate of X=118 Mbps, the fast ring queue 606 has a pacing rate of Y=590 Mbps, the number of seats in the slow ring queue 604 is defined by the parameter SEATS_X=27, the number of seats in the fast ring queue 606 is defined by the parameter SEATS_Y=5, and the maximum output transmit speed of the source device 600 is T=3200 Mbps. Note that the total number of credits n in the shared credit pool 608 is determined by the previously-disclosed relationship where n=T/Y=3200/590=5.4, and which is then truncated to 5.

TABLE 1

Credits required by the fast and slow ring queues.

| Credits required | Seats on slow ring queue | Seats on fast ring queue |
|---|---|---|
| 0 | 0–2 | 0 |
| 1 | 3–7 | 1 |
| 2 | 8–12 | 2 |
| 3 | 13–17 | 3 |
| 4 | 18–22 | 4 |
| 5 | 23–27 | 5 |

From Table 1, it can be seen that the fast ring queue 606 always requires one additional credit in order to fill one additional seat (i.e., a "one-for-one" relationship). On the other hand, the slow ring queue 604 requires one additional credit only on certain occupancies. For example, if the slow ring queue 604 currently contains 19 occupied seats 302, then the $20^{th}$, $21^{st}$, and $22^{nd}$ seats 302 are "free" in the sense that no additional credit is required from the shared credit pool 608, should that seat 302 be filled.

In a worst case, all of the 5 credits of the shared credit pool 608 are used in steady state to support 2.7 Gbps of traffic, for example, 13 "slow" source output streams (i.e., 13 occupied seats 302 which require 3 credits) plus 2 "fast" source output streams (i.e., 2 occupied seats 302 which require 2 credits). Therefore, it is known that $\alpha R+\beta S$ must be less than 2.7 Gbps in order to sustain wire speed at the output port 626 of the source device 600. Notice that only slight speedup is needed, since T=3.2 Gbps.

Although the preferred embodiment has been described in detail, it should be understood that various changes, substitutions, and alterations can be made therein without departing from the spirit and scope of the invention as defined in the appended claims.

What is claimed is:

1. A method of controlling the flow of data in a heterogeneous speed network switching environment, comprising the steps of:

controlling with control logic of a source device the transmission of the data between said source device and a destination device in accordance with a handshaking protocol; and pacing transmission of the data from said source device to said destination device with pacing logic, wherein said pacing logic comprises a plurality of ring queues such that there is a select one of said plurality of ring queues associated with each one of a plurality of bandwidths of said destination device in the heterogeneous speed environment.

2. The method of claim 1, wherein there are two said ring queues and two said bandwidths associated with said destination device in the step of pacing.

3. The method of claim 1, wherein each of said plurality of ring queues operates at a different rate.

4. The method of claim 1, wherein the step of controlling includes the step of arbitrating with arbitration logic transmission of data between a plurality of ring queues of said source device.

5. A method of controlling the flow of data in a heterogeneous speed network switching environment, comprising the steps of:

controlling with control logic of a source device the transmission of the data between said source device and a destination device in accordance with a handshaking protocol; and pacing transmission of the data from said source device to said destination device with pacing logic, wherein the step of controlling includes the step of arbitrating with arbitration logic transmission of data between a plurality of ring queues of said source device, and wherein said plurality of ring queues in the step of arbitrating each processes one or more data requests received from said destination device, and said arbitration logic determines the order in which each of said one or more data request are processed.

6. The method of claim 5, wherein the step of arbitrating includes a step of sharing one or more shared credits of a shared credit pool with a corresponding private credit pool of each ring queue of said plurality of ring queues, the step of sharing performed in accordance with predetermined criteria before a corresponding data request of said one or more data requests is processed.

7. The method of claim 6, wherein a fast ring queue and a slow ring queue of said plurality of ring queues each obtain a select one of said one or more shared credits, in the step of sharing, in accordance with different predetermined criteria, wherein said fast ring queue must remove a select one of said one or more shared credits from said shared credit pool as a requirement to occupying a seat in a head position of said fast ring queue which is vacant.

8. The method of claim 7, wherein before said seat in said head position of said fast ring queue can be occupied, said seat at said head position must be vacant, and a select one of said one or more data requests associated with said fast ring queue must be waiting to be processed, and said select one of said one or more shared credits in said shared credit pool is available for sharing.

9. The method of claim 7, wherein before said seat in said head position in said slow ring queue can be occupied, said seat in said head position of said slow ring queue must be vacant, and a select one of said one or more data requests associated with said slow ring queue must be waiting to be processed, and a shared credit from said shared credit pool is required, if and only if, $$X \cdot (\text{OCCUPIED\_SEATS\_}X+1)+Y \cdot (n-\text{OCCUPIED\_CREDITS\_}X)>T.$$

10. A data flow control architecture in a heterogeneous speed network switching environment, comprising:

control logic of a source device for controlling the transmission of the data between said source device and a destination device in accordance with a handshaking protocol; and pacing logic for pacing transmission of the data from said source device to said destination device, wherein said pacing logic comprises a plurality of ring queues such that there is a select one of said plurality of ring queues associated with each one of a plurality of bandwidths of said destination device in the heterogeneous speed environment.

11. The architecture of claim 10, wherein there are two said ring queues and two said input port bandwidths associated with said destination device.

12. The architecture of claim 10, wherein each of said plurality of ring queues operates at a different rate.

13. The architecture of claim 10, wherein said control logic further comprises arbitration logic for arbitrating transmission of data between a plurality of ring queues of said source device.

14. A data flow control architecture in a heterogeneous speed network switching environment, comprising:

control logic of a source device for controlling the transmission of the data between said source device and a destination device in accordance with a handshaking protocol; and pacing logic for pacing transmission of the data from said source device to said destination device, wherein said control logic further comprises arbitration logic for arbitrating transmission of data between a plurality of ring queues of said source device, and wherein said plurality of ring queues each processes one or more data requests received from said destination device, and said arbitration logic determines the order in which each of said one or more data request signals are processed.

15. The architecture of claim 14, wherein said arbitration logic controls the sharing of one or more shared credits of a shared credit pool with a corresponding private credit pool of each ring queue of said plurality of ring queues, the said one or more shared credits shared in accordance with predetermined criteria before a corresponding data request of said one or more data requests is processed.

16. The architecture of claim 15, wherein a fast ring queue and a slow ring queue of said plurality of ring queues each obtain select ones of said one or more shared credits in accordance with predetermined criteria, wherein said fast ring queue must remove a select one of said one or more shared credits from said shared credit pool as a requirement to occupying a seat in a head position of said fast ring queue which is vacant.

17. The architecture of claim 16, wherein before said seat in said head position of said fast ring queue can be occupied, said seat at said head position must be vacant, and a select one of said one or more data requests associated with said fast ring queue must be waiting to be processed, and said select one of said one or more shared credits in said shared credit pool is available for sharing.

18. The architecture of claim 16, wherein before said seat in said head position in said slow ring queue can be occupied, said seat in said head position of said slow ring queue must be vacant, and a select one of said one or more data requests associated with said slow ring queue must be waiting to be processed, and a shared credit from said shared credit pool is required, if and only if, $$X \cdot (OCCUPIED\_SEATS\_X+1) + Y \cdot (n - OCCUPIED\_CREDITS\_X) > T.$$

19. A method of credit-based pacing of data in a heterogeneous switching environment, comprising the steps of:

controlling with control logic transmission of the data between a source device and a destination device, in accordance with a handshaking protocol, said source device having a plurality of input ports, said plurality of input ports operational at two or more different data bandwidths;

pacing transmission of the data from each of said plurality of input ports of said source device to said destination device with corresponding pacing logic;

arbitrating between said corresponding pacing logic with arbitration logic, transmission of the data from said respective plurality of input ports;

transmitting a data request signal from said destination device to said source device when said destination device is ready to receive the data, said data request signal enqueued in a data request queue of said source device, which said data request queue corresponds to a specific port of said destination device; and forwarding the data to said port of said destination device with said control logic when said data request has been processed by a ring queue of said source device which is associated with said data request queue, which ring queue processes said data request at a rate which reduces congestion in a switching fabric interstitial to said source device and said destination device.

20. A credit-based pacing architecture for forwarding data in a heterogeneous switching environment, comprising:

control logic for controlling transmission of the data between a source device and a destination device, in accordance with a handshaking protocol, said source device having a plurality of input ports, said plurality of input ports operational at two or more different data bandwidths;

corresponding pacing logic for pacing the speed of transmission of the data from each of said plurality of input ports of said source device to said destination device; and arbitrating logic for arbitrating between said corresponding pacing logic transmission of the data from said respective plurality of input ports, wherein a data request signal is transmitted from said destination device to said source device when said destination device is ready to receive the data, said data request signal enqueued in a data request queue of said source device, which said data request queue corresponds to a specific port of said destination device, and wherein the data is forwarded to said port of said destination device by said control logic when said data request has been processed by a ring queue of said source device which is associated with said data request queue, which ring queue processes said data request at a rate which reduces congestion in a switching fabric interstitial to said source device and said destination device.

* * * * *